May 17, 1960 E. A. LINDGREN 2,937,221
ELECTRIC ACCUMULATOR STRUCTURE
Filed April 22, 1957
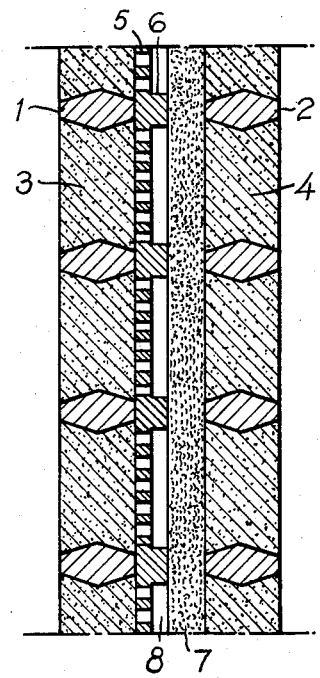
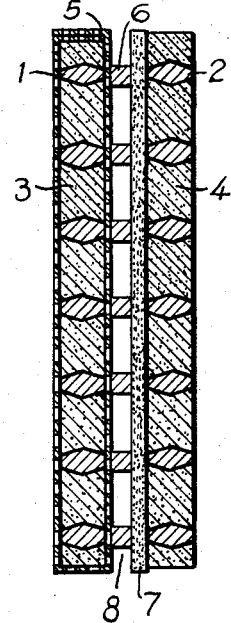
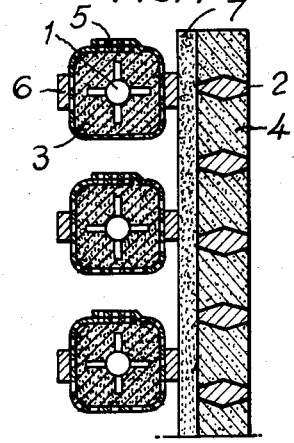
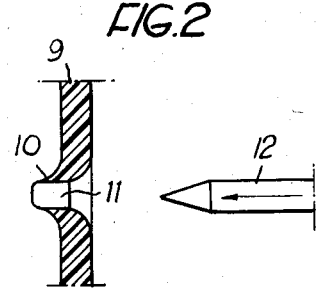

2,937,221
Patented May 17, 1960

2,937,221
ELECTRIC ACCUMULATOR STRUCTURE

Erik Arne Lindgren, Oskarshamn, Sweden, assignor to Svenska Ackumulator Aktiebolaget Jungner, Stockholm, Sweden, a corporation of Sweden Application April 22, 1957, Serial No. 654,328

Claims priority, application Sweden May 5, 1956

9 Claims. (Cl. 136—145)

A very common arrangement of the separating members or separators in electric accumulators, particularly such with a sour electrolyte and with lead and the oxides thereof as active masses, comprises a layer of microporous plastic adjacent the negative electrode, said layer being provided with ribs carrying a layer of glass wool or glass down, which layer is in turn adapted to bear on the positive electrode. The object of the ribbing is primarily to facilitate an improved electrolyte circulation, the glass wool layer being supposed to support and to hold the active material of the positive electrode in its place, that is to say, in a certain degree to "reinforce" this material so as to prevent mass from falling out during the use of the accumulator. In stationary batteries this arrangement has proved satisfactory on the whole, but particularly in batteries subjected to shaking it has been found that the glass fibers would wear off at the edges of the ribbing and that the glass fiber pieces thus loosened would fall down to the bottom of the accumulator vessel. It is self-evident that under such conditions the fibers could not fulfill their "mass reinforcing" function in a satisfactory manner.

The present invention has in practical tests proved to involve a considerable improvement in said respects, the invention also representing a practical and inexpensive accomplishment of the separation. An accumulator according to the invention is primarily distinguished by the feature that the separating member, in addition to comprising a porous, microporous or semi-permeable layer, consists of a layer of plastic or similar material arranged adjacent the positive electrode, the latter layer being finely preperforated by thin needles or needle-shaped projections on a roller. The layer of glass wool or glass down occurring in known accumulators is thus replaced by a layer of finely perforated plastic or similar material adjacent the positive electrode, where it is kept under pressure. The expression "finely perforated" refers in this connection to holes of the order of 0.1–1 millimeter, which are preferably disposed at a pitch which is less than twice the hole diameter.

An example of applying the invention is shown in the drawing, wherein Fig. 1 illustrates a section of a construction in lead accumulators and Fig. 2 shows on a larger scale how the fine perforation is carried out. The positive electrode is designated by 1, the negative one by 2, the respective active masses by 3 and 4, the porous or microporous layer of the separating member or separator by 7, and the finely perforated plastic layer distinguishing the invention by 5. In the construction shown, the perforated layer or sheet is provided with ribs 6 to form free passages 8 in order to improve the electrolyte circulation. The ribs may be produced by pasting or welding narrow strips onto the plastic or by folding or compression moulding of the sheet. It is also possible to insert a layer of perforated and folded plastic foil (for instance so-called decilit) between the porous layer and the finely perforated layer. These layers may either be loose or secured to one another by welding, pasting or the like.

Particularly in lead batteries it has been found to be advantageous to make the perforation with the aid of needles or rollers with needle-shaped sharp projections according to Fig. 2, so that "burrs" are formed on one side of the workpiece, which side is in such case caused to face the positive electrode. This has been found to be exceedingly effective for the retention of the mass and for preventing the paste from falling out. In Fig. 2, 9 denotes the plastic layer, 11 a perforation hole, 10 the highly exaggeratedly shown hole burrs, and 12 the perforation needle.

The perforate plastic sheet may advantageously be folded round one or more of the edges of the positive electrode, whereby only one sheet need be inserted for every positive electrode, or, the perforate plastic may also be formed to a box and be kept together by pasting or welding, said box enclosing the electrode entirely. These two possibilities are illustrated by way of example in Figs. 3 and 4.

Fig. 3 illustrates a sheet of perforate plastic 5 folded round the edges of a positive electrode grating 1 comprising an active mass 3. Also in this case, the separator material comprises a porous layer 7 which engages the negative electrode 2 and its active mass 4. Ribs 6 provide for a space 8 for electrolyte between the layer of plastic 5 and the porous layer 7.

In Fig. 4, the perforate sheet 5 is wound round a rod-shaped positive electrode 1 and its active mass 3, the sheet 5 forming a tube or pocket separated from the plane porous layer 7 at the plane negative electrode 2 by a rib 6. Three positive electrode units of this kind are shown but the number may vary within suitable limits.

The plastic layer may consist of any material suitable for the purpose in view, which is electrolyte-proof, which may be manufactured in suitable thicknesses of approximately 0.1–0.5 millimeters, and which possesses such mechanical properties as to permit perforation without destruction of its structure. As suitable materials might be mentioned polyvinyl chloride, for example, or other vinyl polymers, polystyrene, polyethylene of the "low pressure" type, mylar or possibly plastic laminates such as phenolic-resin-impregnated paper sheets. The porous or microporous layer adjacent to the negative electrode may be constituted by porous plastic or porous or microporous rubber, fabric or fibers of glass or plastic or other suitable material matted together. As suitable plastic materials might be mentioned polyvinyl chloride, nylon, perlon, Dacron or the like, but natural fibers such as cotton or flax may also be considered.

Practical tests have shown that a fine-porous plastic layer may be produced simply by covering a fine-meshed fabric with plastic by spraying, dipping or the like in a quantity so adapted that small holes originating in the fabric meshes remain after the covering with plastic. The plastic layer thus obtained may be combined in the prescribed manner with distance members and a porous material. In the use of alkaline accumulators, where the electrolyte circulation is of a subordinate importance, the plastic layer may be secured onto the porous material directly. It is also conceivable to make use of a fine-meshed fabric which is porous in itself, and one side of which has been given a porous structure by teaseling, said structure being then treated as per above.

Another method of manufacturing separators within the scope of the invention to be used in alkaline accumulators is to apply a plastic layer directly onto the porous material by spraying, rolling or pressing, which layer is then perforated. The porous material must then be sufficiently resilient, so that through-holes will not be produced, even if the perforation needles should penetrate through the material.

A plastic layer of the type described above has been found, when used in alkaline accumulators, to have a very beneficial effect in preventing the separating member by desliming from the electrodes from becoming conductive by degrees on account of paste particles depositing in the same. The explanation should probably be sought in the inferior wetting properties of most plastics, and this explanation is supported by the observation that polyethylene has proved particularly suitable in this respect.

What I claim is:

1. An electric accumulator comprising at least one positive electrode containing an active mass material, at least one negative electrode, an electrolyte impregnating said electrodes, and a separator assembly between said electrodes, said separator assembly comprising a separate layer of a porous resilient material adjacent the negative electrode and a spaced separate layer of a plastic material contiguous with the positive electrode, said plastic layer having a plurality of fine perforations therein, the surface of said plastic material layer contiguous with said positive electrode having annular burrs concentrically surrounding each such perforation in contiguous engagement with the positive electrode for retaining the active mass material in said positive electrode.

2. An electric accumulator as defined in claim 1 wherein the layer of plastic consists of a vinyl polymer.

3. An electric accumulator as defined in claim 1 wherein the layer of plastic consists of polystyrene.

4. An electric accumulator as defined in claim 1 wherein the layer of plastic consists of polyethylene.

5. An electric accumulator as defined in claim 1 wherein the layer of plastic consists of mylar.

6. An electric accumulator as defined in claim 1 wherein the layer of plastic comprises a paper laminate impregnated with phenolic resin.

7. An electric accumulator as defined in claim 1 and further including spacer means intermediate the layers of the separator assembly providing a passage for the electrolyte between the electrodes.

8. An electric accumulator as defined in claim 1 wherein said first separator layer consists of glass fiber.

9. An electric accumulator as defined in claim 1 wherein said positive electrode has the shape of a parallelepiped and said layer of plastic material extends in contiguous engagement with at least four sides of said positive electrode.

References Cited in the file of this patent

UNITED STATES PATENTS

| | | |
|---|---|---|
| 622,124 | Crowders | Mar. 28, 1899 |
| 705,630 | Alexander-Katz | July 29, 1902 |
| 813,582 | Porter | Feb. 27, 1906 |
| 1,056,299 | Pratt | Mar. 18, 1913 |
| 1,141,526 | Chamberlain | June 1, 1915 |
| 1,195,924 | Gould | Aug. 22, 1916 |
| 1,902,267 | Rupp | Mar. 21, 1933 |
| 2,511,887 | Vinal | June 20, 1950 |
| 2,578,534 | Giles et al. | Dec. 11, 1951 |
| 2,594,711 | André | Apr. 29, 1952 |
| 2,729,694 | Ellis | Jan. 3, 1956 |